US012199465B2

United States Patent
Jeong et al.

(10) Patent No.: US 12,199,465 B2
(45) Date of Patent: Jan. 14, 2025

(54) SYSTEM FOR CHARGING BATTERY FOR VEHICLE USING MOTOR DRIVING SYSTEM

(71) Applicants: Hyundai Motor Company, Seoul (KR); Kia Corporation, Seoul (KR)

(72) Inventors: Kang Ho Jeong, Hwaseong-si (KR); Myung Ho Kim, Incheon (KR); Sang Cheol Shin, Suwon-si (KR); Young Seul Lim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 406 days.

(21) Appl. No.: 17/845,192

(22) Filed: Jun. 21, 2022

(65) Prior Publication Data
US 2023/0017022 A1    Jan. 19, 2023

(30) Foreign Application Priority Data

Jul. 19, 2021   (KR) .................. 10-2021-0094435

(51) Int. Cl.
*H02J 7/00* (2006.01)
*H02J 7/14* (2006.01)

(52) U.S. Cl.
CPC ...... *H02J 7/1492* (2013.01); *H02J 7/007182* (2020.01)

(58) Field of Classification Search
None
See application file for complete search history.

(56) References Cited

U.S. PATENT DOCUMENTS

| 2019/0372502 A1* | 12/2019 | Ohashi | H02M 7/53871 |
| 2020/0186074 A1* | 6/2020 | Ghaderi | H02M 1/32 |
| 2023/0017022 A1* | 1/2023 | Jeong | H02J 7/1492 |

FOREIGN PATENT DOCUMENTS

| KR | 10-2021-0008974 A | 1/2021 |
| KR | 10-2021-0027673 A | 3/2021 |
| KR | 10-2021-0122343 A | 10/2021 |

* cited by examiner

*Primary Examiner* — Arun C Williams
(74) *Attorney, Agent, or Firm* — Morgan, Lewis & Bockius LLP

(57) ABSTRACT

A system for charging a battery for a vehicle using a motor driving system that operates a motor having a plurality of windings is disclose. The system includes a first inverter having a plurality of first switching elements, a DC terminal connected to the battery, and an AC terminal connected to one terminal of the plurality of windings, a second inverter having a plurality of second switching elements, a DC terminal selectively short-circuited/opened with the DC terminal of the first inverter, and an AC terminal connected to the other terminal of the plurality of windings, and a controller configured to control an electric connection state between the DC terminals of the first inverter and the second inverter and an open/short-circuited state of the first switching elements and the second switching elements.

15 Claims, 4 Drawing Sheets

SYSTEM FOR CHARGING BATTERY FOR VEHICLE USING MOTOR DRIVING SYSTEM

CROSS REFERENCE TO RELATED APPLICATION

The present application claims priority to Korean Patent Application No. 10-2021-0094435, filed Jul. 19, 2021, the entire contents of which are incorporated herein for all purposes by this reference.

TECHNICAL FIELD

The present disclosure relates to a system for charging a battery for a vehicle using a motor driving system and, more specifically, to a system for charging a battery for a vehicle using a motor driving system, which may charge the battery disposed in the vehicle by using an open-end winding motor driving system that operates a motor by using a plurality of inverters respectively connected to opposite ends of windings installed in the motor.

BACKGROUND

Since the fuel efficiency (or electric efficiency) of eco-friendly vehicles such as electric vehicles that use the torque generated by a motor as power is determined by inverter-motor power conversion efficiency, it is important to maximize the power conversion efficiency of an inverter and the efficiency of a motor to improve the fuel efficiency.

Accordingly, the applicant of this application has been proposed a technology that may operate a driving motor by selectively determining a closed-end winding mode in which the driving motor is operated after a Y-connection is formed by connecting one ends of windings disposed in the driving motor of a vehicle each other and an open-end winding mode in which opposite ends of motor windings are respectively connected to an invert so that the driving motor is operated while both the ends of the motor winding are open.

Meanwhile, in general, an electric vehicle or a plug-in hybrid vehicle converts electric power provided from an external charging facility into a state suitable for charging a battery disposed in the vehicle and provides it to the battery, thereby charging the battery.

Conventionally, charging equipment for rapid charging has been manufactured to output a single voltage standard of 400 V, but batteries used in vehicles tend to be designed to have a voltage of 800 V or higher to increase efficiency and driving range. Accordingly, to charge a battery for a vehicle having various voltage levels, charging facilities of various voltage bands that meet battery voltage specifications should be provided or one charging facility should be implemented so that it is possible to output multiple voltage bands.

Building such a charging infrastructure not only consumes a lot of money, but also may cause a problem in that charging time increases as charging power decreases when voltage is lowered due to the charging current limitation of the charging facility.

Accordingly, in the art, in a motor driving system that operates a motor in the open-end winding mode by using a plurality of inverters, it is required that a battery charging technique that may charge a battery by converting the level of the charging voltage provided by the charging facility built as the existing infrastructure without additional apparatuses and additional costs.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problem occurring in the related art, and the present disclosure is intended to provide a system for charging a battery for a vehicle using a motor driving system to charge the battery by properly converting the level of a charging voltage provided from an external charging facility with the motor driving system that operates a motor in an open-end winding mode without a separate exclusive conversion apparatus.

To achieve this, according to the present disclosure, a system for charging a battery for a vehicle using a motor driving system that operates a motor having a plurality of windings respectively corresponding to a plurality of phases may include: a first inverter including a plurality of first switching elements and having a DC terminal connected to the battery and an AC terminal connected to one terminal of the plurality of windings; a second inverter including a plurality of second switching elements and having a DC terminal selectively short-circuited/opened with the DC terminal of the first inverter and an AC terminal connected to the other terminal of the plurality of windings; and a controller, in a charging mode for charging the battery, configured to control an electric connection state between the DC terminal of the first inverter and the DC terminal of the second inverter and an open/short-circuited state of the plurality of first switching elements and the plurality of second switching elements based on the level of a DC charging voltage applied to the DC terminal of the second inverter and a level of a voltage of the battery.

According to one embodiment of the present disclosure, the battery charging system may further include: a first charging power application switch configured to allow the one terminal to be connected to a high potential terminal of the DC terminal of the second inverter and apply a high potential of the DC charging voltage to the other terminal; and a second charging power application switch configured to allow one terminal to be connected to a low potential terminal of the DC terminal of the second inverter and apply a low potential of the DC charging voltage to the other terminal, wherein in the charging mode, the controller may control the first charging power application switch and the second charging power application switch to be in the short-circuited state.

According to one embodiment of the present disclosure, when the level of the DC charging voltage is a voltage capable of charging the battery in the charging mode, the controller may open the plurality of first switching elements and the plurality of second switching elements and electrically connect the DC terminal of the first inverter and the DC terminal of the second inverter.

According to one embodiment of the present disclosure, when the level of the DC charging voltage is less than the voltage of the battery in the charging mode, the controller may electrically open the DC terminal of the first inverter and the DC terminal of the second inverter with each other, short-circuit a switching element connected to the high potential terminal of the second inverter among the plurality of second switching elements, open a switching element connected to the low potential terminal of the second inverter among the plurality of second switching elements, open a switching element connected to the high potential terminal of the first inverter among the plurality of first switching elements, and boost the DC charging voltage through pulse width modulation control of a switching element connected to the low potential terminal of the first inverter among the plurality of first switching elements to apply the boosted DC charging voltage to the battery.

According to one embodiment of the present disclosure, when the level of the DC charging voltage is greater than the voltage of the battery in the charging mode, the controller may electrically open the DC terminal of the first inverter and the DC terminal of the second inverter with each other, open the plurality of first switching elements, open the switching element connected to the low potential terminal of the DC terminal of the second inverter among the plurality of second switching elements, and drop the DC charging voltage through pulse width modulation control of a switching element connected to the high potential terminal of the DC terminal of the second inverter among the plurality of second switching elements to apply the dropped DC charging voltage to the battery.

According to one embodiment of the present disclosure, the battery charging system may further include a third charging power application switch configured to allow the one terminal to be connected to the DC terminal of the first inverter and allow the other terminal to be connected to the DC terminal of the second inverter.

According to one embodiment of the present disclosure, when the level of the DC charging voltage is the voltage capable of charging the battery in the charging mode, the controller may open the plurality of first switching elements and the plurality of second switching elements and short-circuit the third charging power application switch.

According to one embodiment of the present disclosure, when the level of the DC charging voltage is less than the voltage of the battery in the charging mode, the controller may open the third charging power application switch, short-circuit the switching element connected to the high potential terminal of the second inverter among the plurality of second switching elements, open the switching element connected to the low potential terminal of the DC terminal of the second inverter among the plurality of second switching elements, open the switching element connected to the high potential terminal of the first inverter among the plurality of first switching elements, and boost the DC charging voltage through pulse width modulation control of the switching element connected to the low potential terminal of the first inverter among the plurality of first switching elements to apply the boosted DC charging voltage to the battery.

According to one embodiment of the present disclosure, when the level of the DC charging voltage is greater than the voltage of the battery in the charging mode, the controller may open the third charging power application switch, open the plurality of first switching element, open the switching element connected to the low potential terminal of the DC terminal of the second inverter among the plurality of second switching elements, and boost the DC charging voltage through pulse width modulation control of the switching element connected to the low potential terminal of the DC terminal of second inverter among the plurality of second switching elements to apply the boosted DC charging voltage to the battery.

As another means for solving the above technical problem, a system for charging a battery for a vehicle using a motor driving system that operates a motor having a plurality of windings respectively corresponding to a plurality of phases may include: a first inverter including a plurality of first switching elements and having a DC terminal connected to the battery and an AC terminal connected to one terminal of the plurality of windings; a second inverter including a plurality of second switching elements and having a DC terminal selectively short-circuited/opened with the DC terminal of the first inverter and an AC terminal connected to the other terminal of the plurality of windings; a first charging power application switch configured to allow the one terminal to be connected to a high potential terminal of the DC terminal of the second inverter and allow the other terminal to receive a high potential of a DC charging voltage applied thereto; a second charging power application switch configured to allow the one terminal to be connected to a low potential terminal of the DC terminal of the second inverter and allow the other terminal to receive a low potential of the DC charging voltage applied thereto; a third charging power application switch configured to allow one terminal to be connected to the DC terminal of the first inverter and allow the other terminal to be connected to the DC terminal of the second inverter; and a controller, in a charging mode for charging the battery, configured to control an open/short-circuit state of the first to third charging power application switches, the plurality of first switching elements, and the plurality of second switching elements based on a level of the DC charging voltage applied to the DC terminal of the second inverter and a level of a voltage of the battery.

According to one embodiment of the present disclosure, when the level of the DC charging voltage is a voltage capable of charging the battery in the charging mode, the controller may short-circuit the first charging power application switch and the second charging power application switch, open the plurality of first switching elements and the plurality of second switching elements, and short-circuit the third charging power application switch.

According to one embodiment of the present disclosure, when the level of the DC charging voltage is less than the voltage of the battery in the charging mode, the controller may short-circuit the first charging power application switch and the second charging power application switch, open the third charging power application switch, open a switching element connected to the high potential terminal of the DC terminal of the second inverter among the plurality of second switching elements, open a switching element connected to the low potential terminal of the DC terminal of the second inverter among the plurality of second switching elements, open a switching element connected to the high potential terminal of the DC terminal of the first inverter among the plurality of first switching elements, and boost the DC charging voltage through pulse width modulation control of a switching element connected to the low potential terminal of the first inverter among the plurality of first switching elements to application the boosted DC charging voltage to the battery.

According to one embodiment of the present disclosure, when the level of the DC charging voltage is greater than the voltage of the battery in the charging mode, the controller may short-circuit the first charging power application switch and the second charging power application switch, open the third charging power application switch, open the plurality of first switching elements, open a switching element connected to the low potential terminal of the DC terminal of the second inverter among the plurality of second switching elements, and drop the DC charging voltage through pulse width modulation control of a switching element connected to the high potential terminal of the second inverter among the plurality of second switching elements to apply the dropped DC charging voltage to the battery.

According to the system for charging a battery for a vehicle using a motor driving system of the present disclosure, a level of a charging voltage may be properly converted in accordance with a level of a charging voltage provided from an external charger by using the motor driving system disposed for operating the motor in an open-end winding mode, so that the battery may be charged.

Accordingly, the system for charging a battery for a vehicle using a motor driving system does not require construction of additional infrastructure for a high-voltage charging facility due to high voltage use in the battery for a vehicle, thereby preventing occurrence of social costs for constructing the infrastructure.

Moreover, the system for charging a battery for a vehicle using a motor driving system may not drop the voltage of the charging facility having current limitation but drop a voltage level by using the motor driving system installed in the vehicle when a charging voltage provided from the charging facility is greater than a battery voltage, so that a problem of a charging power reduction problem occurring in the charging facility when the charging voltage is dropped, thereby solving a problem that a battery charging time is increased due to dropping the charging voltage.

Moreover, the system for charging a battery for a vehicle using a motor driving system may operate the motor in a high-efficiency open-end winding mode and also allow battery charging corresponding to various external charging voltages.

The effects obtainable in the present disclosure are not limited to the above-mentioned effects, and other effects not mentioned will be clearly understood by those of ordinary skill in the art to which the present disclosure belongs from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Hereinafter, a system for charging a battery of a vehicle using a motor driving system according to various embodiments of the present disclosure will be described in detail with reference to the accompanying drawings.

Figure 1:
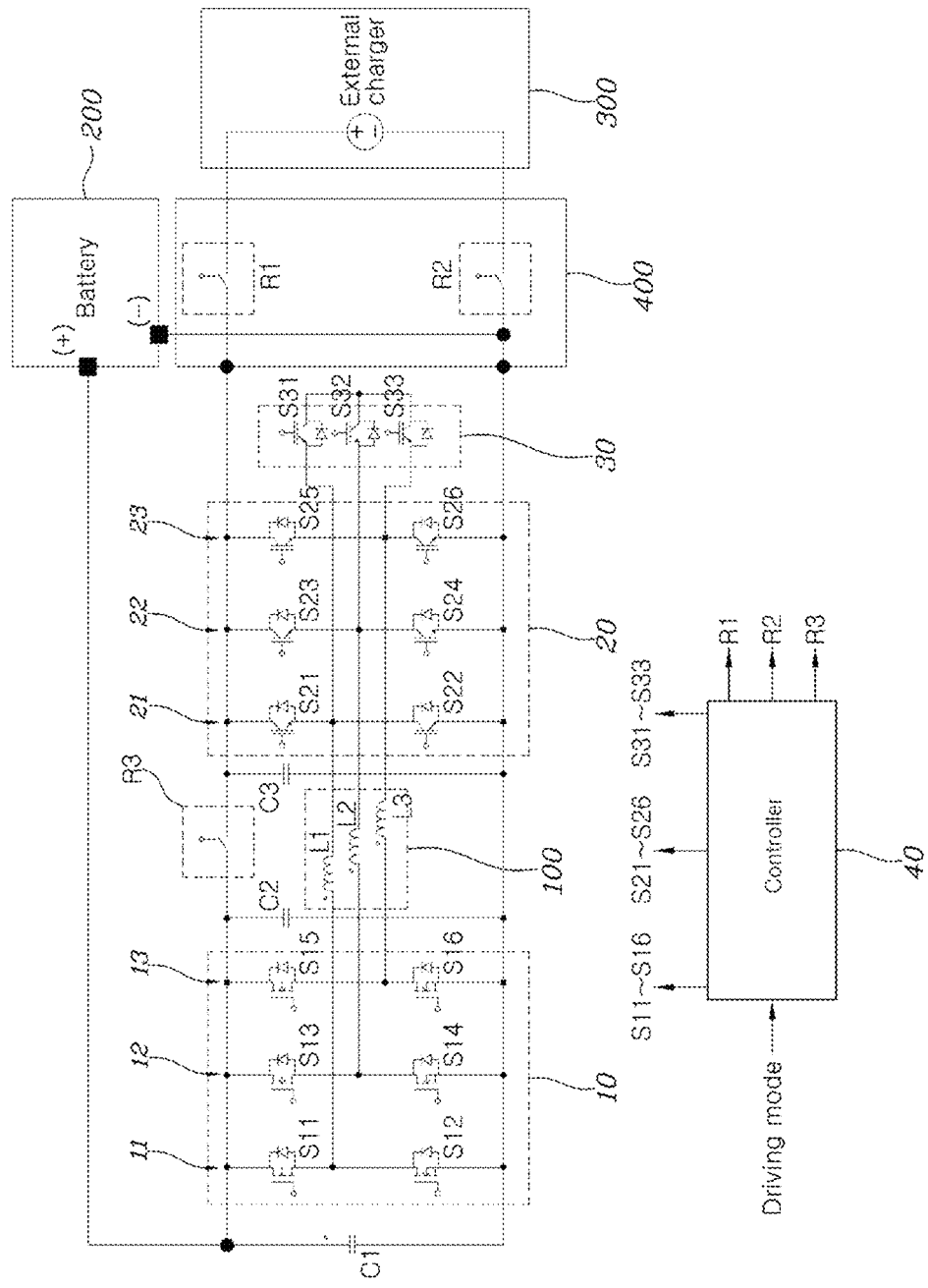
FIG. 1 is a circuit diagram of a system for charging a battery of a vehicle using a motor driving system according to an embodiment of the present disclosure.

FIG. 1 is a circuit diagram of a system for charging a battery of a vehicle using a motor driving system according to an embodiment of the present disclosure.

Referring to FIG. 1, a system for charging a battery for a vehicle using a motor driving system according to one embodiment of the present disclosure is a battery charging system using a motor driving system that supplies driving power to a motor 100 having a plurality of windings L1 to L3.

The motor driving system may include a first inverter 10 including a plurality of first switching elements S11 to S16 and connected to one end of each winding of the motor 100, a second inverter 20 including a plurality of second switching elements S21 to S26 and connected to the other end of each winding of the motor 100, and a plurality of switching elements S31 to S33 configured to allow one end to be connected to the other end of each winding of the motor 100 and allow the other ends to be short-circuited to each other.

The first inverter 10 may include a DC terminal to which a DC voltage formed between a positive terminal and a negative terminal of a battery 200 is applied and an AC terminal connected to each winding L1 to L3 of the motor 100. Two nodes in which the first inverter 10 is connected to the positive terminal and the negative terminal of the battery 200 may be the DC terminal, and three nodes in which the first inverter 10 is connected to one end of each winding of the motor 100 may be the AC terminal.

Similarly, the second inverter 20 may include a DC terminal selectively connected to the DC terminal of the first inverter 10 and an AC terminal connected to each winding L1 to L3 of the motor 100. Two nodes including one node in which the second inverter 20 is selectively connected to the DC terminal of the first inverter 10 may be the DC terminal, and three nodes in which the second inverter 20 is connected to the other end of each winding of the motor 100 may be the AC terminal.

The DC terminal of the first inverter 10 and the DC terminal of the second inverter 20 may be selectively short-circuited/opened by a charging power application switch R3. The state of the charging power application switch R3 may be controlled by a controller 40.

In a motor driving mode in which the motor generates power for driving the vehicle, the first inverter 10 and the second inverter 20 are connected to a DC terminal of the battery 200 in common so that DC power stored in the battery 200 may be converted into three-phase AC power and the converted DC power may be provided to the motor 100, or regenerative braking energy generated due to generation of regenerative braking torque of the motor 100 during regenerative braking may be converted into DC so that the direct current may be provided to the battery 200. The conversion between the DC power and the AC power may be performed through pulse width modulation control of a plurality of first switching elements S11 to S16 and a plurality of second switching elements S21 to S26 respectively provided in the first inverter 10 and the second inverter 20.

The first inverter 10 may include a plurality of legs 11 to 13 to which a DC voltage formed in the DC terminal is applied. Each leg 11 to 13 may correspond to each of a plurality of phases of the motor 100 to form an electrical connection.

More specifically, a first leg 11 may include two switching elements S11 and S12 connected in series between two nodes forming the DC terminal, and a connection node of the two switching elements S11 and S12 may be connected to one end of the winding L1 of one phase so that AC power corresponding to one phase among the plurality of phases is input/output.

Similarly, a second leg 12 may include two switching elements S13 and S14 connected in series between two nodes forming the DC terminal, and a connection node of the two switching elements S13 and S14 may be connected to one end of the winding L2 of one phase in the motor 100 so that AC power corresponding to one phase among the plurality of phases of the motor is input/output.

In addition, a third leg 13 may include two switching elements S15 and S16 connected in series between two nodes forming the DC terminal, and a connection node of the two switching elements S15 and S16 may be connected to one end of the winding L3 of one phase in the motor 100 so that AC power corresponding to one phase among the plurality of phases in the motor 100 is input/output.

The second inverter 20 may also have a configuration similar to that of the first inverter 10. The second inverter 20 may include a plurality of legs 21 to 23 to which the DC voltage of the DC terminal, to which the DC voltage between the two terminals of the battery 200 is applied, is applied. Each of the legs 21 to 23 may correspond to the plurality of phases of the motor 100 to form an electrical connection.

More specifically, a first leg 21 may include two switching elements S21 and S22 connected in series between two nodes forming the DC terminal, and a connection node of the two switching elements S21 and S22 may be connected to the other end of the winding L1 of one phase so that AC power corresponding to one phase among the plurality of phases is input/output.

Similarly, a second leg 22 may include two switching elements S23 and S24 connected in series between two nodes forming the DC terminal, and a connection node of the two switching elements S23 and S24 may be connected to the other end of the winding L2 of one phase in the motor 100 so that AC power corresponding to one phase among the plurality of phases of the motor is input/output.

In addition, a third leg 23 may include two switching elements S25 and S26 connected in series between two nodes forming the DC terminal, and a connection node of the two switching elements S25 and S26 may be connected to the other end of the winding L3 of one phase in the motor 100 so that AC power corresponding to one phase among the plurality of phases in the motor 100 is input/output.

The first inverter 10 is connected to one end of the windings L1 to L3 of the motor 100 and the second inverter 20 is connected to the other end of the windings L1 to L3 of the motor 100. That is, opposite ends of the windings L1 to L3 of the motor 100 may be electrically connected to each other in an open-end winding structure connected to the first inverter 10 and the second inverter 20.

The switching elements S11 to S16 and S21 to S26 included in the first inverter 10 and the second inverter 20 are switching elements included in a conventional inverter for driving a motor, and an IGBT or FET in which actual switching is performed, so it should be understood as a concept including an IGBT, an FET, or a diode connected in a reverse direction between an source and drain of an IGBT or FET, in which actual switching is performed.

A plurality of changeover switches S31 to S33 may be connected to the other end of the windings L1 to L3 of the motor 100 (AC terminal of the second inverter). One end of the plurality of changeover switches S31 to S33 is connected to one end of the windings L1 to L3 of the motor 100 and the other ends of the plurality of changeover switches S31 to S33 are connected to each other, so that an electrical short may be formed.

When the plurality of changeover switches S31-S33 are opened, opposite ends of the windings L1-L3 of the motor 100 are connected to the first inverter 10 and the second inverter 20, respectively, and an open-end winding structure may be formed.

In addition, when the plurality of changeover switches S31-S33 are short-circuited, the other ends of the windings L1-L3 of the motor 100 are electrically shorted to each other, so that the windings L1-L3 of the motor 100 may form an electrical connection of a closed-end winding structure forming a Y connection.

When the plurality of changeover switches S31 to S33 are open, opposite ends of the windings L1 to L3 of the motor 100 are respectively connected to the first inverter 10 and the second inverter 20, so that an open-end winding structure may be formed. In addition, when the plurality of changeover switches S31 to S33 are short-circuited, the other ends of the windings L1 to L3 of the motor 100 are electrically shorted to each other, so that the windings L1 to L3 of the motor 100 may form an electrical connection of a closed-end winding structure forming a Y-connection. When the electrical connection of the closed end winding structure is formed, the motor 100 may be operated through pulse width modulation control of the switching elements S11 to S16 of the first inverter 10, and all of the switching element S21 to S26 of the second inverter 20 may always maintain an open state.

The plurality of changeover switches S31 to S33 play a role of switching a circuit connection structure for operating the motor between the open-end winding structure and the closed-end winding structure, and thus may be collectively referred to as a changeover switch unit 30.

Like the first switching element or the second switching element, the plurality of changeover switches S31 to S33 in the changeover switch unit 30 may be implemented as a MOSFET, an IGBT, and the like.

The controller 40 may control pulse wave modulation of the switching elements S11 to S16 and S21 to S26 included in the first inverter 10 and the second inverter 20 so that the motor 100 may be operated based on a required output required for the motor 100 in a motor driving mode.

More specifically, the controller 40 may determine the inverter to be used for operating the motor based on the required output of the motor 100, determine a turn-on/off state of the plurality of changeover switches S31 to S33 of the changeover switch unit 30 according to a determination result, and may control pulse width modulation of the switching element of the determined converter.

For example, when an output required for the motor 100 is smaller than a preset reference value, the controller 40 may operate the motor 100 by setting all of the plurality of changeover switches S31 to S33 of the changeover switch unit 30 to a short-circuited state and controlling the pulse wave modulation of the switching elements S11 to S16 of the first inverter 10 without operating the second inverter 20 (closed-end winding mode).

In the closed-end winding mode, the motor is driven by allowing the controller 40 to control the pulse wave modulation of the plurality of switching elements S11 to S16 of the first inverter 10 based on a DC voltage applied to the DC terminal of the first inverter 10, a phase current provided to the motor 100 from the AC terminal of the inverter 10, a motor rotation angle detected by a motor rotor sensor (not illustrated) installed in the motor 100, and the like. Since various techniques for operating the motor 100 through pulse width modulation control of a plurality of switching elements in an inverter are already known in the art, further detailed description of a pulse width modulation control method of the inverter will be omitted.

On the other hand, when the output required for the motor 100 is greater than the preset reference value, the controller 100 may be operated by setting all of the plurality of changeover switches S31 to S33 of the changeover switch unit 30 to an open state and operating both the first inverter 10 and the second inverter 20 (open-end winding mode).

That is, in the open-end winding mode, the motor 100 may be operated by setting one end of the plurality of windings L1 to L3 to the open state with each other, also setting the other end thereof to the open state with each other, and controlling the pulse wave modulation of two inverters 10 and 20 respectively connected to opposite ends of the windings L1 to L3.

In the open-end winding mode, the motor is driven by allowing the controller 40 to receive, as input, a DC voltage applied to the DC terminal of the first inverter 10 and the second inverter 20, phase currents respectively provided to the plurality of windings corresponding to each phase of the motor 100, a motor rotation angle detected by a motor rotor sensor (not illustrated) installed in the motor 100, and the like to control the pulse wave modulation of both the switching elements S11 to S16 of the first inverter 10 and the switching elements S21 to S26 of the second inverter 20.

Since various techniques for operating the motor 100 through pulse width modulation control of two inverters connected to opposite ends of windings in the open-end winding mode are already known in the art, further detailed description of a pulse width modulation control method of the inverter will be omitted.

One embodiment of the present disclosure may further include charging power application switches R1 and R2 to connect/disconnect an electrical connection between an external charger 300 and the motor driving system in a charging mode for charging a battery.

The controller 40 may control the charging power application switches R1 and R2 to be in a short-circuited state to allow a DC charging voltage provided from the external charger 300 to be applied to the DC terminal of the second inverter 20.

In addition, the controller 40 may control the switching elements S11 to S16 and S21 to S26 included in the first inverter and the second inverter 20 and a third charging power application switch R2 to charge battery 200 by applying the DC charging voltage to the battery 200 without or after changing the level of the DC charging voltage based on the level of the DC charging voltage provided from the external charger 300 and the voltage level of the battery 200.

A vehicle may include a charging inlet (not illustrated) to which the external charger 300 is connected, and the charging inlet may be engaged with a charging outlet of the external charger 300 during charging. The charging outlet of the external charger 300 has a high potential terminal (positive terminal) and a low potential terminal (negative terminal) forming a charging voltage, and these terminals may be respectively connected to a high potential terminal and a low potential terminal of the charging inlet. The first charging power application switch R1 may be connected between the high potential terminal of the charging inlet and the high potential terminal of the second inverter 20, and the second charging power application switch R2 may be connected between the low potential terminal of the charging inlet and the low potential terminal of the second inverter 20.

In a motor driving mode, the controller 40 may control the first charging power application switch R1 and the second charging power application switch R2 to be always in an open state and may control the third charging power application switch R3 between the DC terminal of the first inverter 10 and the DC terminal of the second inverter 20 to be always in a short-circuited state.

In addition, in the battery charging mode, the controller 40 may controls the first charging power application switch R1 and the second charging power application switch R2 to be always in a short-circuit state and may selectively control the state of the third charging power application switch R3 whether the external charging voltage is directly applied to the battery 200 or the external charging voltage is converted based on the level of the charging voltage applied from the outside and the level of the battery 200.

Various switching means known in the art may be applied to the first charging power application switch R1 to the third charging power application switch R3, but the first charging power application switch R1 to the third charging power application switch R3 are used for the purpose of determining the open/short state during mode switching or boosting/dropping determination and maintaining the determined state while the mode continues, so high-speed switching is not required. Accordingly, the first charging power application switch R1 to the third charging power application switch R3 are preferably implemented as relays.

Here, the first charging power application switch R1 and the second charging power application switch R2 may be implemented in the form of a junction box 400 for forming an electrical connection relationship in a circuit. For example, the junction box 400 may be a hardware form including wiring for forming a connection between a low voltage terminal of the battery 200 and the ground, wiring between the first charging power application switch R1 and the external charger and between the second charging power application switch R2 and the external charger, and wiring between the first charging power application switch R1 and the DC terminal of the second inverter 20 and between the second charging power application switch R2 and the DC terminal of the second inverter 20.

Figure 2:
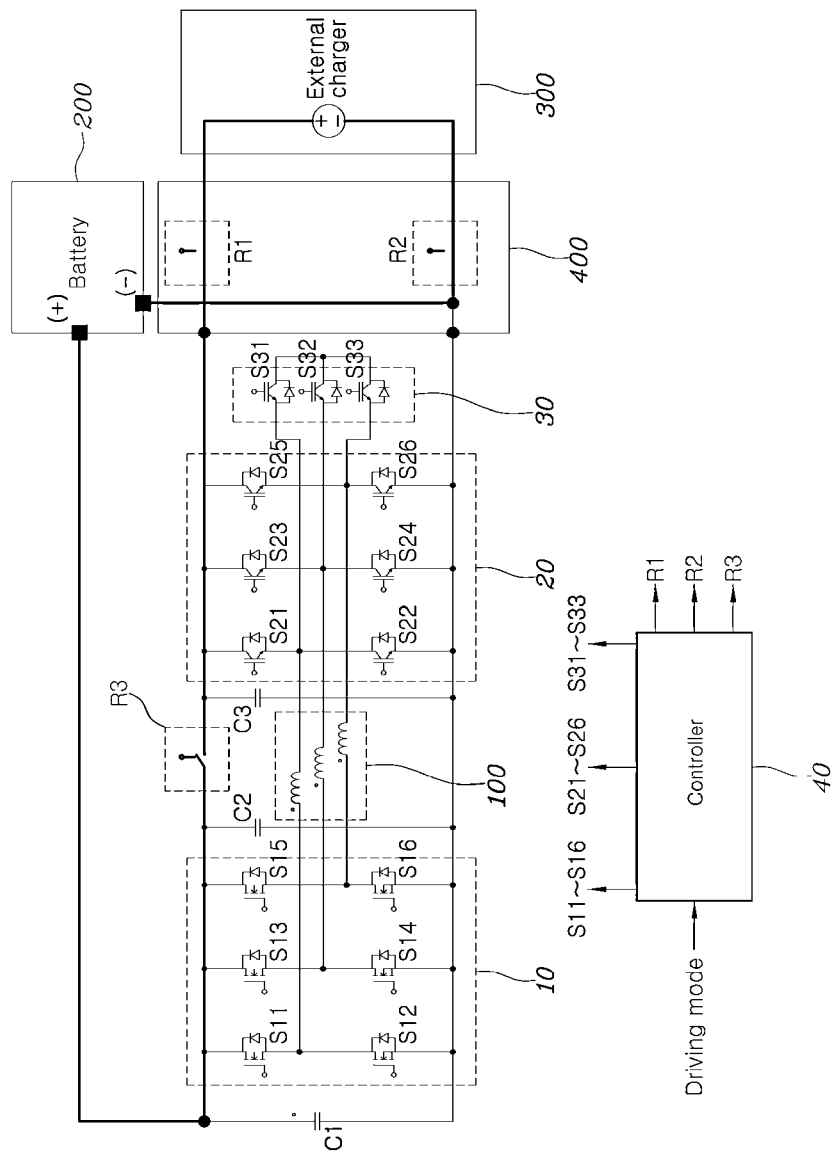
FIGS. 2 to 4 are views illustrating operating states of a system for charging a battery of a vehicle using a motor driving system according to an embodiment of the present disclosure.
Figure 3:
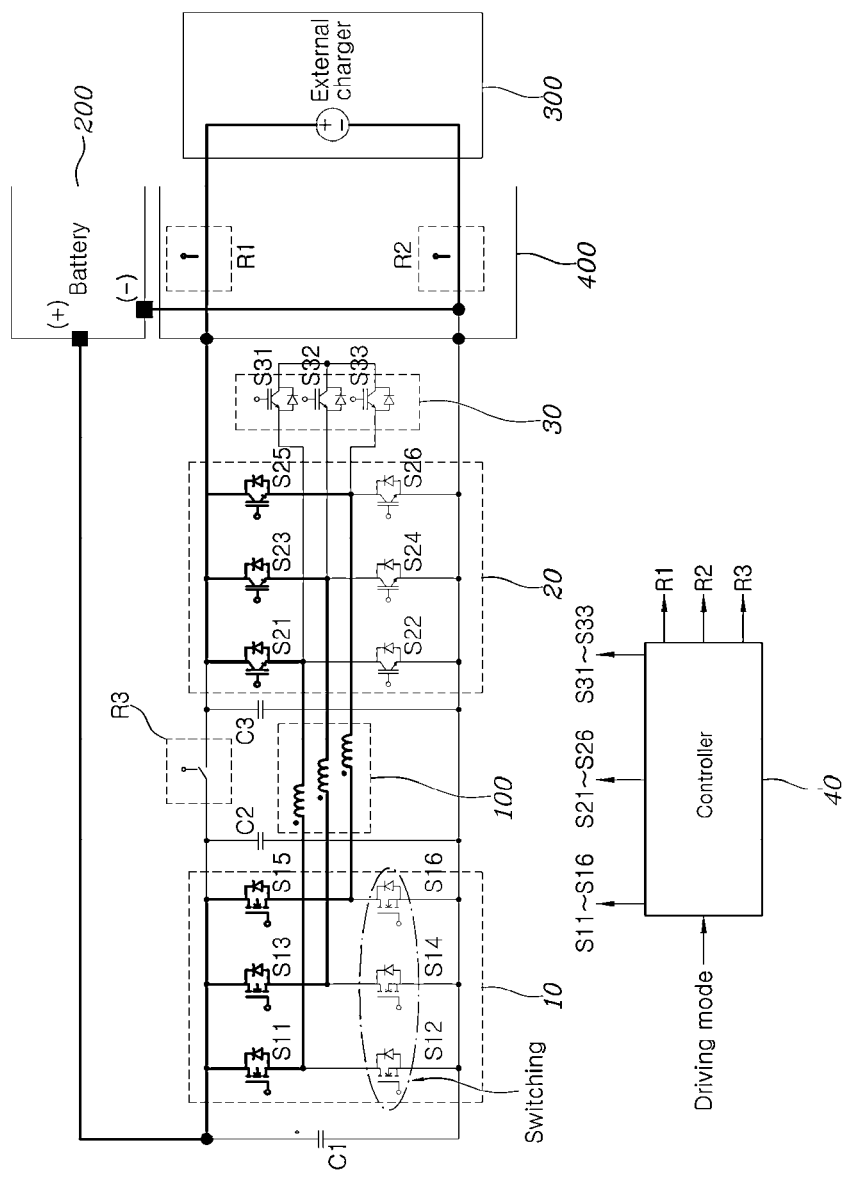
Figure 4:
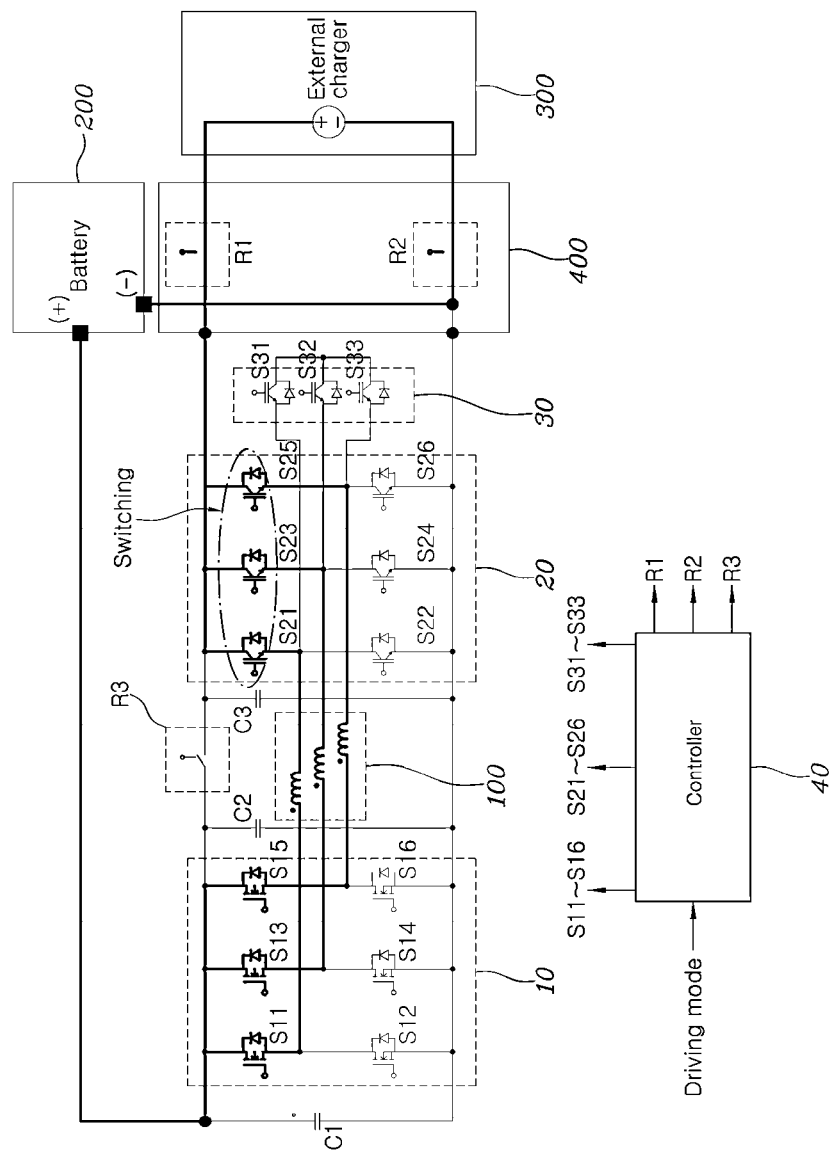

FIGS. 2 to 4 are views illustrating operating states of a system for charging a battery of a vehicle using a motor driving system according to an embodiment of the present disclosure.

First, FIG. 2 illustrates an example of a case in which the level of the charging voltage provided from the external charger 300 has a level suitable for charging the battery 200.

In a case in which the battery 200 may be charged by directly applying the external charging voltage to the battery 200 when the level of the external charging voltage is greater than the voltage of the battery 200 within a preset range, as illustrated in FIG. 2, the controller 40 may allow an external charging power to be directly applied to the battery 200 through the DC terminal of the second inverter 20 and the DC terminal of the first inverter 10 by controlling the first to all of third charging power application switches R1 to R3 to be in the short-circuit state.

In this case, the controller 40 may control the switching elements S11 to S16 and S21 to S26 in the first inverter 10 and the second inverter 20 to be in the open state.

Here, the range of the level of the external charging voltage capable of charging the battery 200 may be determined in advance according to battery specifications and the like, and the battery 200 may be charged through dropping control of the external charging voltage, which will be described later, when the level of the external charging voltage is greater than the level of a preset maximum voltage allowable by the battery 200.

Next, FIG. 3 illustrates an example in which the charging voltage supplied from the external charger 300 is lower than the voltage of the battery 200 installed in the vehicle in the charging mode.

As illustrated in FIG. 3, in the charging mode, the controller 40 may control the charging power application switches R1 and R2 to be in the short-circuit state and may control the third charging power application switch R3 to be in the open state.

In addition, when the charging voltage supplied from the charger 300 is lower than the voltage of the battery 200 installed in the vehicle, the controller 40 may control all of the switching elements S21, S23, and S25 connected to the high potential terminal of the second inverter 20 among the switching elements S21 to S26 of the second inverter 20 to be maintained in the short-circuit state and may control all of the switching elements S22, S24, and S26 connected to the low potential terminal of the second inverter 20 among the switching elements S21 to S26 of the second inverter 20 to be maintained in the open state.

Moreover, the controller 40 may control all of the switching elements S11, S13, and S15 connected to the high potential terminal of the first inverter 10 among the switching elements S11 to S16 of the first inverter 10 to be maintained in the open state and may control pulse wave modulation of all of the switching elements S12, S14, and S16 connected to the low potential terminal of the first inverter 10 among the switching elements S11 to S16 of the first inverter 10.

That is, the windings of the motor 100, a diode of the switching elements S11, S13, and S15 connected to the high potential terminal of the first inverter 10 connected to one end of the windings, and the switching elements S12, S14, and S16 connected to the low potential terminal of the first inverter 10 to be controlled by pulse width modulation may form a topology of a boost converter capable of boosting a voltage in a direction from the external charger 300 to the battery 200.

The charging voltage provided from the external charger 300 is boosted and provided to the battery 200 by using the topology of the boost converter, so that the battery 200 may be charged.

Hereinafter, the switching element connected to the high potential terminal of the DC terminal of each inverter is referred to as an upper switching element of each inverter, and the switching element connected to the low potential terminal of the DC terminal of each inverter is referred to as the lower of each inverter.

In addition, in FIG. 3, all of the switching elements connected to coils corresponding to a plurality of phases in the motor are illustrated as being boosted, but the controller 40 may perform boosting through pulse width modulation control of the coils corresponding to one or two phases of the plurality of phases and the switching element connected thereto.

In the case of performing boosting by controlling the coils corresponding to two or more phases and the switching element connected thereto, the controller 40 may control a boosting converter in multiple phases in an interleaved manner.

Since the booting converter including a coil (inductor), a diode, and a switch to increase the level of voltage through pulse width modulation control of the switch and an interleaved control technique using a plurality of boosting converters are well known in the art, further description thereof will be omitted.

Next, FIG. 4 illustrates an example of a case in which the charging voltage supplied from the external charger 300 is greater than the voltage of the battery 200 installed in the vehicle in the charging mode, that is, a case in which the external charging voltage should be dropped.

As illustrated in FIG. 4, in the charging mode in which dropping charging is performed, the controller 40 may control both the first and second charging power application switches R1 and R2 to be in the short-circuit state and control the third charging power application switch R3 to be in the open state.

In addition, when the charging voltage supplied from the charger 300 is greater than the range of the level of voltage capable of charging the battery 200, the controller 40 may control all of the switching elements S11 to S16 of the first inverter 10 to be in the open state, control all of the lower switching elements S22, S24, and S26 of the second inverter to be maintained in the open state, and perform pulse wave modulation control of the upper switching elements S21, S23, and S25 of the second inverter 20.

That is, the windings of the motor 100, the switching elements S21, S23, and S25 connected to the high potential terminal of the second inverter 20 connected to one end of the winding to be switched by pulse width modulation control, and a diode of the switching elements S22, S24, and S26 connected to the low potential terminal of the second inverter 20 may form a topology of a buck converter capable of dropping the voltage in a direction from the external charger 300 to the battery 200. The charging voltage provided from the external charger 300 is dropped and provided to the battery 200 by using the topology of the buck converter, so that the battery 200 may be charged.

Even at the time of dropping, dropping may be performed by controlling the coil corresponding to a part of the coils corresponding to the plurality of phases and the switching element connected thereto. In addition, when dropping is performed by controlling the coils corresponding to two or more phases and the switching element connected thereto, the controller 40 may control dropping converters corresponding to multiple phases in an interleaved manner.

The controller 40 may include a processor or a microprocessor. Optionally, the controller 40 may also include a memory. The aforementioned operations/functions of the controller 40 can be embodied as computer readable code/algorithm/software stored on the memory thereof which may include a non-transitory computer readable recording medium. The non-transitory computer readable recording medium is any data storage device that can store data which can thereafter be read by the processor or the microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or the microprocessor may perform the above described operations/functions of the controller 40, by executing the computer readable code/algorithm/software stored on the non-transitory computer readable recording medium.

As described above, a system for charging a battery for a vehicle using a motor driving system according to various embodiments of the present disclosure may properly convert the level of a charging voltage according to the level of a charging voltage provided from an external charger by using the motor driving system disposed for one-end winding operation of a motor, thereby charging the battery.

Accordingly, the system for charging a battery for a vehicle using a motor driving system according to various embodiments of the present disclosure may remove the need to additionally build an additional infrastructure for a high-voltage charging facility in accordance with high voltage usage of a vehicle battery, thereby preventing social costs for constructing the infrastructure.

Moreover, the system for charging a battery for a vehicle using a motor driving system according to various embodiments of the present disclosure may not drop the voltage of the charging facility having current limitation but drop a voltage level by using the motor driving system installed in the vehicle when a charging voltage provided from the charging facility is greater than a battery voltage, so that a problem of a charging power reduction problem occurring in the charging facility when the charging voltage is dropped, thereby solving a problem that a battery charging time is increased due to dropping the charging voltage.

In addition, the system for charging a battery for a vehicle using a motor driving system according to various embodiments of the present disclosure may operate the motor in a high-efficiency open-end winding mode and also allow battery charging corresponding to various external charging voltages.

Although the preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A battery charging system for charging a battery connected to a motor having a plurality of windings respectively corresponding to a plurality of phases, the battery charging system comprising:
   a first inverter including a plurality of first switching elements and having a DC terminal connected to the battery and an AC terminal connected to a first terminal of the plurality of windings;
   a second inverter including a plurality of second switching elements and having a DC terminal selectively short-circuited/opened with the DC terminal of the first inverter and an AC terminal connected to a second terminal of the plurality of windings; and
   a controller, in a charging mode for charging the battery, configured to control an electric connection state between the DC terminal of the first inverter and the DC terminal of the second inverter and an open/short-circuited state of the plurality of first switching elements and the plurality of second switching elements based on a level of a DC charging voltage applied to the DC terminal of the second inverter and a level of a voltage of the battery.

2. The battery charging system of claim 1, further comprising:
   a first charging power application switch including a first end connected to a high potential terminal of the DC terminal of the second inverter and a second end to which a high potential of the DC charging voltage is applied; and
   a second charging power application switch including a first end connected to a low potential terminal of the DC terminal of the second inverter and a second end to which a low potential of the DC charging voltage is applied,
   wherein in the charging mode, the controller is configured to control the first charging power application switch and the second charging power application switch to be in the short-circuited state.

3. The battery charging system of claim 1, wherein when the level of the DC charging voltage is a voltage capable of charging the battery in the charging mode, the controller is configured to open the plurality of first switching elements and the plurality of second switching elements and electrically connect the DC terminal of the first inverter and the DC terminal of the second inverter.

4. The battery charging system of claim 1, wherein when the level of the DC charging voltage is less than the voltage of the battery in the charging mode, the controller is configured to electrically open the DC terminal of the first inverter and the DC terminal of the second inverter with each other, short-circuit a switching element connected to the high potential terminal of the second inverter among the plurality of second switching elements, open a switching element connected to the low potential terminal of the second inverter among the plurality of second switching elements, open a switching element connected to the high potential terminal of the first inverter among the plurality of first switching elements, and boost the DC charging voltage through pulse width modulation control of a switching element connected to the low potential terminal of the first inverter among the plurality of first switching elements to apply the boosted DC charging voltage to the battery.

5. The battery charging system of claim 1, wherein when the level of the DC charging voltage is greater than the voltage of the battery in the charging mode, the controller is configured to electrically open the DC terminal of the first inverter and the DC terminal of the second inverter with each other, open the plurality of first switching elements, open the switching element connected to the low potential terminal of the DC terminal of the second inverter among the plurality of second switching elements, and drop the DC charging voltage through pulse width modulation control of a switching element connected to the high potential terminal of the DC terminal of the second inverter among the plurality of second switching elements to apply the dropped DC charging voltage to the battery.

6. The battery charging system of claim 1, further comprising:
   a third charging power application switch including a first end connected to the DC terminal of the first inverter and a second end connected to the DC terminal of the second inverter.

7. The battery charging system of claim 6, wherein when the level of the DC charging voltage is the voltage capable of charging the battery in the charging mode, the controller is configured to open the plurality of first switching elements and the plurality of second switching elements and short-circuit the third charging power application switch.

8. The battery charging system of claim 6, wherein when the level of the DC charging voltage is less than the voltage of the battery in the charging mode, the controller is configured to open the third charging power application switch, short-circuit the switching element connected to the high potential terminal of the second inverter among the plurality of second switching elements, open the switching element connected to the low potential terminal of the DC terminal of the second inverter among the plurality of second switching elements, open the switching element connected to the high potential terminal of the first inverter among the plurality of first switching elements, and boost the DC charging voltage through pulse width modulation control of the switching element connected to the low potential terminal of the first inverter among the plurality of first switching elements to apply the boosted DC charging voltage to the battery.

9. The battery charging system of claim 6, wherein when the level of the DC charging voltage is greater than the voltage of the battery in the charging mode, the controller is configured to open the third charging power application switch, open the plurality of first switching element, open the switching element connected to the low potential terminal of the DC terminal of the second inverter among the plurality of second switching elements, and boost the DC charging voltage through pulse width modulation control of the switching element connected to the low potential terminal of the DC terminal of second inverter among the plurality of second switching elements to apply the boosted DC charging voltage to the battery.

10. The battery charging system of claim 1, wherein the battery charging system is configured to charge the battery for a vehicle using a motor driving system that operates the motor having the plurality of windings.

11. A battery charging system for charging a battery connected to a motor having a plurality of windings respectively corresponding to a plurality of phases, the battery charging system comprising:
- a first inverter including a plurality of first switching elements and having a DC terminal connected to the battery and an AC terminal connected to a first terminal of the plurality of windings;
- a second inverter including a plurality of second switching elements and having a DC terminal selectively short-circuited/opened with the DC terminal of the first inverter and an AC terminal connected to a second terminal of the plurality of windings;
- a first charging power application switch including a first end connected to a high potential terminal of the DC terminal of the second inverter and a second end to which a high potential of a DC charging voltage applied;
- a second charging power application switch including a first end connected to a low potential terminal of the DC terminal of the second inverter and a second terminal to which a low potential of the DC charging voltage applied;
- a third charging power application switch including a first end connected to the DC terminal of the first inverter and a second end connected to the DC terminal of the second inverter; and
- a controller, in a charging mode for charging the battery, configured to control an open/short-circuit state of the first to third charging power application switches, the plurality of first switching elements, and the plurality of second switching elements based on a level of the DC charging voltage applied to the DC terminal of the second inverter and a level of a voltage of the battery.

12. The battery charging system of claim 11, wherein when the level of the DC charging voltage is a voltage capable of charging the battery in the charging mode, the controller is configured to short-circuit the first charging power application switch and the second charging power application switch, open the plurality of first switching elements and the plurality of second switching elements, and short-circuit the third charging power application switch.

13. The battery charging system of claim 11, wherein when the level of the DC charging voltage is less than the voltage of the battery in the charging mode, the controller is configured to short-circuit the first charging power application switch and the second charging power application switch, open the third charging power application switch, open a switching element connected to the high potential terminal of the DC terminal of the second inverter among the plurality of second switching elements, open a switching element connected to the low potential terminal of the DC terminal of the second inverter among the plurality of second switching elements, open a switching element connected to the high potential terminal of the DC terminal of the first inverter among the plurality of first switching elements, and boost the DC charging voltage through pulse width modulation control of a switching element connected to the low potential terminal of the first inverter among the plurality of first switching elements to application the boosted DC charging voltage to the battery.

14. The battery charging system of claim 11, wherein when the level of the DC charging voltage is greater than the voltage of the battery in the charging mode, the controller is configured to short-circuit the first charging power application switch and the second charging power application switch, open the third charging power application switch, open the plurality of first switching elements, open a switching element connected to the low potential terminal of the DC terminal of the second inverter among the plurality of second switching elements, and drop the DC charging voltage through pulse width modulation control of a switching element connected to the high potential terminal of the second inverter among the plurality of second switching elements to apply the dropped DC charging voltage to the battery.

15. The battery charging system of claim 11, wherein the battery charging system is configured to charge the battery for a vehicle using a motor driving system that operates the motor having the plurality of windings.

* * * * *